United States Patent [19]
Shibamoto

[11] 3,791,666
[45] Feb. 12, 1974

[54] SAFETY DEVICE FOR VEHICLES SUCH AS AUTOMOBILES
[76] Inventor: Iwao Shibamoto, No. 31-7, 2 chome Nishi Sugamo Toshimaku, Tokyo, Japan
[22] Filed: Nov. 3, 1971
[21] Appl. No.: 195,183

[52] U.S. Cl............ 280/150 AB, 5/348 R, 182/137
[51] Int. Cl. ............................................ B60r 21/08
[58] Field of Search ........... 280/150 AB; 244/138 R

[56] References Cited
UNITED STATES PATENTS

| | | | |
|---|---|---|---|
| 3,675,942 | 7/1972 | Huber | 280/150 AB |
| 3,508,724 | 4/1970 | Scher et al. | 244/138 R |
| 3,624,810 | 11/1971 | Hass | 280/150 AB |
| 3,632,133 | 1/1972 | Hass | 280/150 AB |
| 2,974,912 | 3/1961 | Namsick | 244/138 R |
| 3,250,065 | 5/1966 | Frost | 280/150 AB X |

FOREIGN PATENTS OR APPLICATIONS
896,312  10/1953  Germany..................... 280/150 AB Primary Examiner—David Schonberg
Assistant Examiner—John P. Silverstrim
Attorney, Agent, or Firm—Eric H. Waters et al.

[57] ABSTRACT

A safety device for automobiles, comprises a normally folded bag, an air column structure on said bag which is inflatable to expand said bag into its original shape at the time of collision of the automobile, means for inflating said air column structure, air passage openings for introducing external air into the interior of the bag therethrough in the process of expansion of said bag by virtue of the pressure differential between the interior and exterior of said bag and means for trapping the thus introduced air within said bag, said air passage openings being formed at a portion of the bag adjacent a mounting base on which said bag is mounted and being in communication with duct means formed in said mounting base.

2 Claims, 11 Drawing Figures

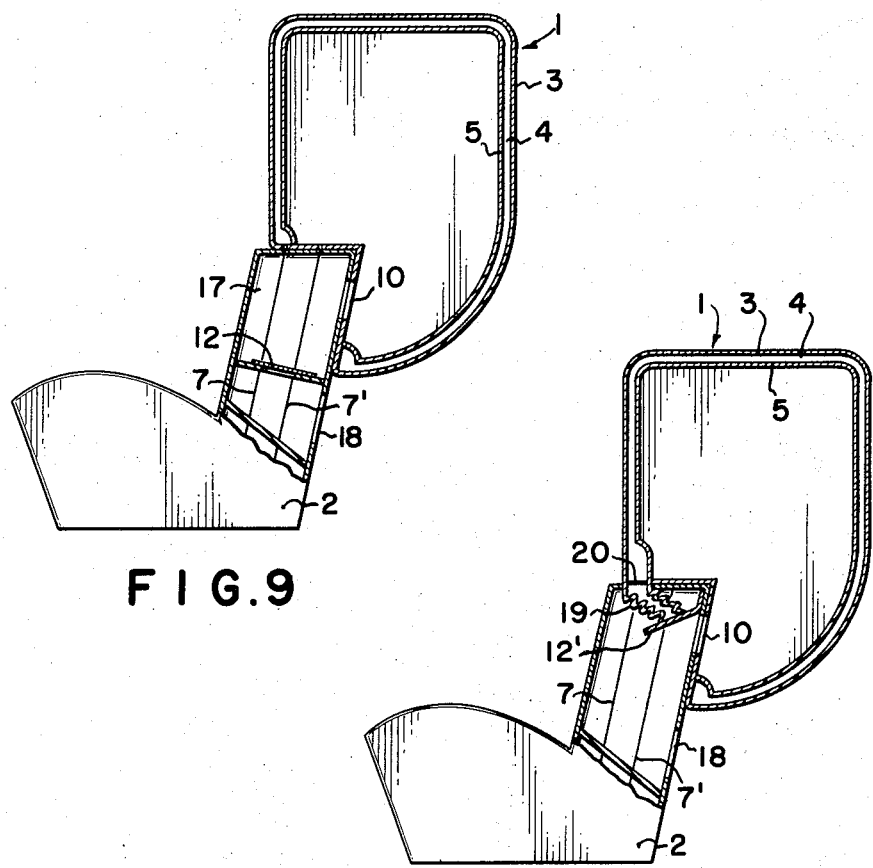

SAFETY DEVICE FOR VEHICLES SUCH AS AUTOMOBILES

With the number and speed of automobiles rapidly increasing in these days, an increasing number of peoples are losing their lives or injured by traffic accidents. The present invention has been achieved with a view to protecting the lives of the passengers of automobiles against the shock of collision.

For protecting the lives of the passengers of automobiles, the so-called shock absorbing device has already been known which is so designed that a bag is instantaneously inflated at the time of collision to hold the passengers against abrupt movement under the shock of collision. However, in the conventional device, the folded bag is inflated by introducing a liquefied gas or compressed air thereinto, so that when the interior of the automobile is sealed against the outside, the internal pressure of the automobile increases, frequently resulting in rupture of the ear drums of the passengers. Further, since the internal pressure of the inflated bag is higher than the internal pressure of the automobile, said inflated bag has the same effect as a solid material on the passenger's body when the passenger's body is brought into contact therewith, and thus injures the passenger's body. Furthermore, since the inflated bag is compressed by the passenger's body with the internal pressure thereof increasing, the passenger's body is subjected to a strong repulsive force and occasionally damaged thereby. In addition, the explosion and expansion of the liquefied gas or the expansion of the compressed air are or is accompanied by unpleasant sounds which attack the auditory nerve of the passenger.

The present invention aims to eliminate or otherwise alleviate the above defects.

The invention consists in a safety device of the type which is so designed that a bag which is normally folded is expanded into its original shape at the time of collision of an automobile and the surrounding air is caused to flow into the bag through air passage openings in said bag, incident to the expansion of the bag, by virtue of the pressure differential between the interior and exterior of said bag, and is trapped therein.

The primary object of the invention is to provide a safety device of the type described, in which means for trapping air in the bag is provided at a concealed portion of the bag so as not to be visible from the outside.

According to one aspect of the invention, the air passage openings of the bag are formed at that portion of the bag which is attached to the automobile seat or other mounting base and means for trapping air in the bag consists of the flap check valves provided at said portion of the bag for cooperation with said air passage openings.

The automobile seat or other mounting base has duct means for leading the surrounding air into the air passage openings of the bag.

According to another aspect of the invention, the flap check valves are provided at the inlet openings of the duct means.

According to still another aspect of the invention, the flap check valves are provided in the duct means.

According to still another aspect of the invention, the flap check valves are mounted in such a manner as to close the air passage openings and there is provided means for operating said valves.

The present invention will be more fully understood from the following description which reference to the accompanying drawings which show several embodiments of the invention.

FIGS. 8 and 9 are views showing the flap check valves as mounted at different locations respectively;

FIG. 10 is a view showing still another construction of the flap check valve; and FIG. 11 is a view showing the flap check valve of FIG. 10 as actuated.

Figure 1:
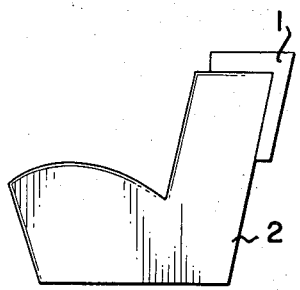
FIG. 1 is a view showing a bag mounted in a folded state on a seat.
Figure 2:
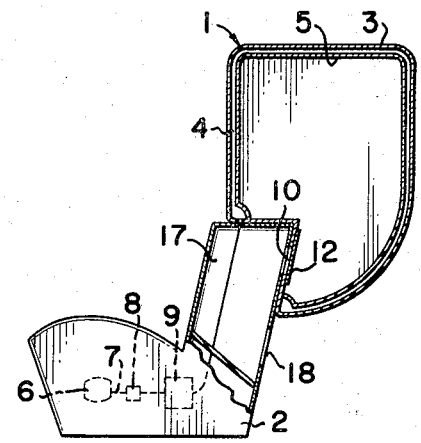
FIG. 2 is a view similar to FIG. 1 but showing the bag in a expanded state.
Figure 3:
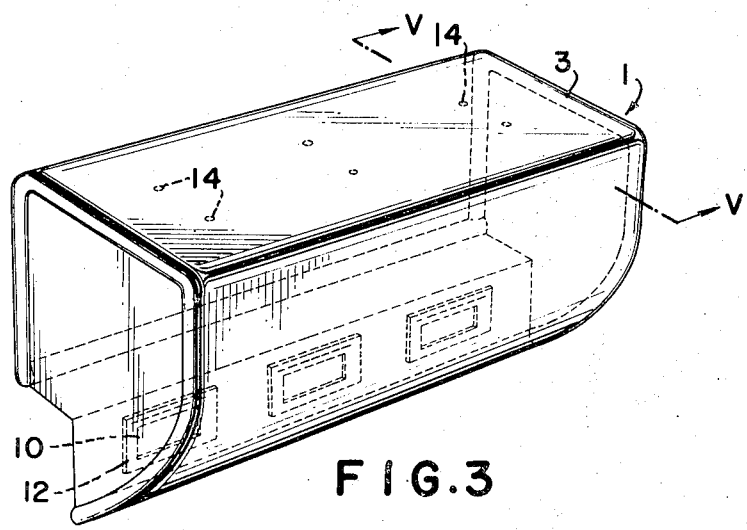
FIG. 3 is a perspective view of the bag.
Figure 4:
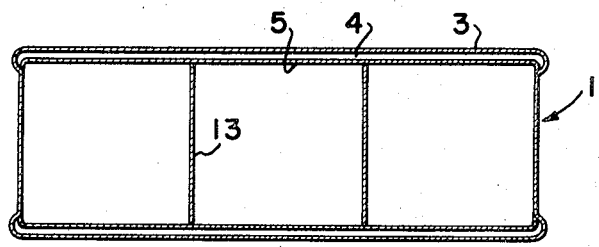
FIG. 4 is a transverse sectional view of the bag.
Figure 5:
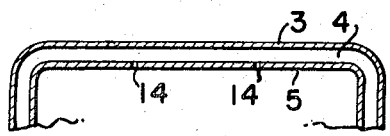
FIG. 5 is a sectional view on the line V—V of FIG. 3.

Referring to the drawings and particularly to FIGS. 1 through 5, the bag according to the present invention is mounted in a folded state on the back of an automobile seat 2. Of course, it will be obvious that the bag 1 may be mounted on a portion (not shown) other than the seat 2. The bag 1 has a double wall structure except for the portion which is to be mounted on the seat or other mounting base. Namely, the bag of double wall structure is comprised of an outer wall 3 and an inner peripheral wall 5 extending along the inner periphery of said outer wall 3 to constitute therebetween an inflatable air column structure 4, said outer wall and said inner peripheral wall respectively been made of a flexible, light, air impervious material (e.g. a resin-impregnated nylon fabric).

Reference numeral 6 designates a freon tank, 7 a pipe connecting said freon tank 6 and the air column structure 4 with each other and 8 an electromagnetic valve provided intermediate of said pipe 7 and connected to a shock signal generator or shock predicting signal generator (not shown), the arrangement being such that said electromagnetic valve 8 is opened in response to a signal from said signal generator. Reference numeral 9 designates a freon evaporator for gasifying liquid freon supplied from the tank 6. A plurality of air passage openings 10 are formed in the portion 11 of the bag at which said bag is mounted on the seat or other mounting base, and flap check valves 12 are openably provided interior of the bag 1, each adjacent each air passage opening 10 and each having one edge thereof bonded or sewed to said bag, for co-operation with said respective openings. The interior of the bag 1 is divided into a plurality of sections by partition members 13 which are made of a flexible, light, air impervious material and serve to block the movement of air within the bag 1.

The inner peripheral wall 5 of the bag 1 is formed with small holes 14 (FIGS. 3 and 5) for communicating the air column structure 4 with the interior of the bag 1 so as to allow part of the fluid, introduced into said air column structure for inflating the same, to flow into the interior of said bag. In the embodiment shown in FIG. 6, opening 15 are formed in the inner peripheral wall 5 instead of the small holes and said openings are each closed by a sealing plate 16 which can be ruptured by the fluid pressure introduced into the air column structure 4 when said fluid pressure has reached a predetermined level. In the seat 2 on which the bag 1 is to be mounted are formed duct means extending therethrough, with inlet ends 18 thereof open to the outside, for leading external air into the air passage openings 10 of the bag 1.

Figure 6:
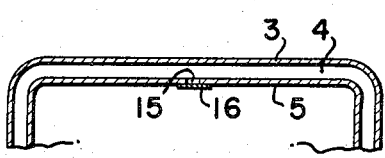
FIG. 6 is a view similar to FIG. 5 but showing another type of the bag.

The safety device of the invention constructed as described above operates as follows: When the electromagnetic valve 8 is opened in response to a signal from the shock signal or shock predicting signal generator, the liquefied freon flows from the freon tank 6 through the pipe 7 into the freon evaporator 9 and is gasified therein to generate freon gas. The freon gas thus generated flows through the pipe 7 into the portion of the folded bag 1 enclosed by the outer wall 3 and the inner peripheral wall 5, that is, the air column structure 4, suddenly inflating said air column structure. The inflation of the air column structure 4 causes the bag to expand into its original shape, whereby the external air flows through the duct means 17 in the seat and the air passage openings 10 into the interior of the expanded bag 1 by virtue of the pressure differential between the interior and exterior of said bag. Thus, the bag 1 forms an air bag. During inflation of the bag 1 into its original shape, part of the gas within the air column structure 4 flows through the small holes 14 in the inner peripheral wall 5 into the interior of the bag 1 to build up the internal pressure of said bag to a level higher than the atmospheric pressure. In the embodiment of FIG. 6, the internal pressure of the air column structure is similarly built up and when the pressure differential between the interior of said air column structure and the interior of said bag exceeds a certain value, the sealing plates 15 rupture allowing part of the gas in the air column structure 4 to flow into the interior of the bag. For instance, when the sealing plates rupture at the point when the folded bag restores its original shape, the internal pressure of the bag rises from about the atmospheric pressure to a higher pressure, whereupon the check valves 12 close the respective air passage openings 10 to trap the air within the bag 1. Therefore, the air bag thus formed has the effect of holding the passenger's body against abrupt movement.

Figure 7:
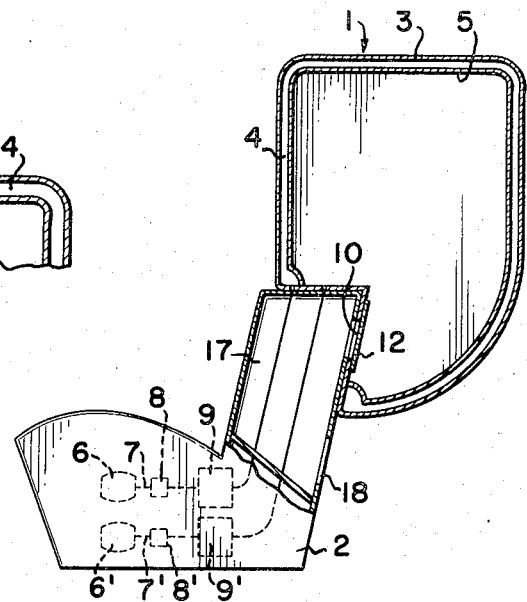
FIG. 7 is a view similar to FIG. 2 but showing another embodiment of the safety device of the invention.

FIG. 7 shows another embodiment in which the gas is introduced directly into the interior of the bag and not through the inflated air column structure 4. In this embodiment is provided one more of the unit shown in FIG. 2 and consisting of the freon tank 6, the electromagnetic valve 8 and the freon evaporator 9. In the Figure, these elements are indicated by the same reference numerals as in FIG. 2 with (') suffixed thereto respectively, and a pipe 7' is communicated with the interior of the bag 1 for introducing the freon gas from the evaporator 9' into said bag 1 therethrough. Thus, when the bag 1 is expanded into its original shape in the manner described above with reference to FIG. 2, the electromagnetic valve 8' is opened with a certain time delay following the actuation of the electromagnetic valve 8, in response to an electric signal supplied thereto from delay means (not shown) and the liquefied freon is supplied from the freon tank 6' through the pipe 7' into the evaporator 9', wherein it is gasified to generate freon gas and the freon gas thus generated is introduced into the bag. As a result of the freon gas being introduced into the bag which has already filled with the external air, the internal pressure of the bag rises above the atmospheric pressure and causes the check valves to close the respective air passage openings, so that the air-gas mixture is trapped within said bag.

Although in the embodiments described above use is made freon gas to inflate the air column structure for expanding the bag into its original shape and to build up the internal pressure of the bag above the atmospheric pressure, it should be understood that compressed air may be used for the same purposes.

Further, although in the embodiments described above the air column structure is composed of the outer wall and the inner peripheral wall, this air column structure may be a tube formed along the peripheral edges or peripheral surfaces of the outer wall.

Figure 8:
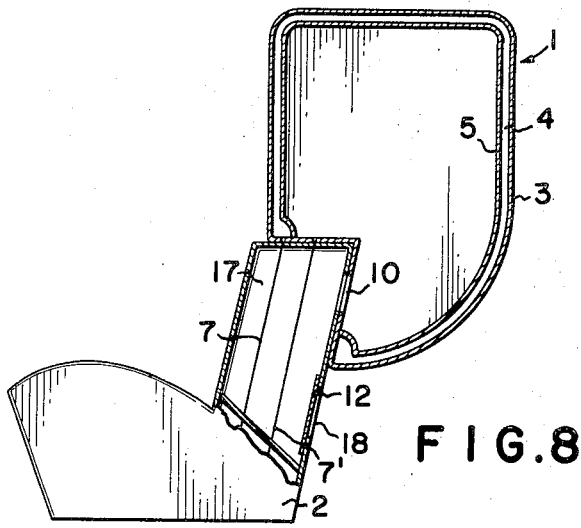

FIG. 8 shows still another embodiment in which the flap check valves 12 is provided at the air inlet openings 18 of the duct means in the seat 1, and FIG. 9 shows still another embodiment in which said flap check valves 12 are provided intermediate of the duct means 17 between the air inlet openings 18 of said duct means and the air passage openings 18 of the bag respectively.

FIG. 10 shows still another embodiment in which flap check valves 12' are pivoted to the duct means 17 so as to close the respective air passage openings 10 of the bag externally and inflatable air columns 19 extending from the air column structure 4 of the bag are connected to said flap check valves 12' respectively. The air column structure 4 and the air columns 19 are normally held out of communication with each other by means of rupturable sealing plates 20. Thus, in this embodiment the freon gas flows into the air column structure to inflate the same for expanding the bag into its original shape and thereby the external air is caused to flow into the bag through the duct means and the air passage openings 10 of the bag. Upon completion of the expansion of the bag into its original shape in the manner described above, the sealing plates 20 rupture under the internal gas pressure of the air column structure 4 and the gas in said air column structure 4 flows into the air columns 19 to inflate the same. Thus, the air columns 19 are stretched causing the flap check valves 12' to move toward the respective air passage openings 10 to close the same (FIG. 11). It may of course be possible to introduce the gas directly into the air columns 19, without associating said air columns with the air column structure 4.

As will be understood from the foregoing description, it is possible according to the invention to minimize the internal pressure rise of the vehicle so as not to damage the auditory nurve of the passengers and yet to prevent effectively the movement of the passengers' bodies. Further, according to the invention the flap check valves operate efficiently as they are located at the immovable portion of the bag which is not exposed to the outside.

What is claimed is:

1. Safety apparatus for a vehicle having a passenger compartment comprising: an inflatable bag located within the vehicle and communicating with the atmosphere through air passage openings permitting air to enter the bag; a source of inflating fluid operable upon the sensing of a vehicle collision; a flexible, inflatable, tubular framework operatively associated with said bag, said framework being connected to said source for receiving inflating fluid therefrom upon said source being operated, said tubular framework, when inflated, being adapted to expand said bag to create a pressure differential between the interior and the exterior of said bag to draw air from the atmosphere through said air passage openings to said bag; a mounting base on which said bag is mounted; duct means formed in said mounting base and communicating with said air passage openings in said bag for introducing the air from the atmosphere into said bag; flap valves located in said duct means adjacent to said air passage openings in said bag for trapping indrawn air within said bag; and, inflatable air columns operatively associated with said tubular framework and said flap valves, said inflatable air columns being connected to said source of inflating fluid for receiving the inflating fluid therefrom upon said source being operated, said inflatable air columns and said framework being inflatable for operating said flap valves so as to close said air passage openings of said bag when air has been introduced into said expanded bag.

2. A safety apparatus according to claim 1, said duct means having air inlet openings in a portion thereof remote from said air passage openings in said bag, said flap valves being check valves for closing said air inlet openings.

* * * * *

UNITED STATES PATENT OFFICE
CERTIFICATE OF CORRECTION

Patent No. 3,791,666      Dated February 12, 1974

Inventor(s) Iwao Shibamoto

It is certified that error appears in the above-identified patent and that said Letters Patent are hereby corrected as shown below:

On the cover sheet insert:

-- [30] Foreign Application Priority Data

Japan     97011     Nov. 5, 1970     --.

Signed and sealed this 14th day of January 1975.

(SEAL)
Attest:

McCOY M. GIBSON JR.　　　　　　C. MARSHALL DANN
Attesting Officer　　　　　　　　Commissioner of Patents